United States Patent
Renaud et al.

(10) Patent No.: US 12,235,355 B2
(45) Date of Patent: Feb. 25, 2025

(54) AUTOMOTIVE LIGHTING DEVICE

(71) Applicant: VALEO VISION, Bobigny (FR)

(72) Inventors: Pierre Renaud, Bobigny (FR); Alexandre Joerg, Bobigny (FR)

(73) Assignee: VALEO VISION, Bobigny (FR)

( * ) Notice: Subject to any disclaimer, the term of this patent is extended or adjusted under 35 U.S.C. 154(b) by 134 days.

(21) Appl. No.: 17/631,392

(22) PCT Filed: Jul. 22, 2020

(86) PCT No.: PCT/EP2020/070638
§ 371 (c)(1),
(2) Date: Sep. 14, 2022

(87) PCT Pub. No.: WO2021/018680
PCT Pub. Date: Feb. 4, 2021

(65) Prior Publication Data
US 2023/0048569 A1  Feb. 16, 2023

(30) Foreign Application Priority Data

Jul. 31, 2019 (FR) ........................ 1908765
Jun. 9, 2020 (FR) ........................ 2006005

(51) Int. Cl.
*G01S 13/931* (2020.01)
*F21S 41/20* (2018.01)
*F21S 45/00* (2018.01)

(52) U.S. Cl.
CPC .............. *G01S 13/931* (2013.01); *F21S 41/28* (2018.01); *F21S 45/00* (2018.01); *G01S 2013/93277* (2020.01)

(58) Field of Classification Search
CPC ................................. F21S 41/28; G01S 13/931
(Continued)

(56) References Cited

U.S. PATENT DOCUMENTS

| 2015/0109162 A1 | 4/2015 | Binzer |
| 2018/0045826 A1 | 2/2018 | Kasaba et al. |

(Continued)

FOREIGN PATENT DOCUMENTS

| CN | 107026308 A | 8/2017 |
| CN | 107042799 A | 8/2017 |

(Continued)

OTHER PUBLICATIONS

International Search Report mailed on Oct. 26, 2020 in PCT/EP2020/070638 filed on Jul. 22, 2020, 3 pages.

(Continued)

*Primary Examiner* — Christopher M Raabe
(74) *Attorney, Agent, or Firm* — Oblon, McClelland, Maier & Neustadt, L.L.P.

(57) ABSTRACT

An automotive lighting device including a light source configured to emit light in a light direction, a sensor and a cover. The sensor is configured to acquire information outside the lighting device by emitting a wave in a sensor direction, the wavelength of the wave being comprised between 1 mm and 1 cm. The cover comprises a first portion located in the light direction and a second portion located in the sensor direction, the second portion including a sensor region having a refractive index and a thickness which is between 0.8 and 1.2 times an ideal thickness, the ideal thickness being equal to a natural number multiplied by the wavelength and divided by two times the refractive index.

7 Claims, 2 Drawing Sheets

(58) Field of Classification Search
USPC .......................................................... 362/546
See application file for complete search history.

(56) References Cited

U.S. PATENT DOCUMENTS

| | | |
|---|---|---|
| 2019/0011106 A1 | 1/2019 | Kwak et al. |
| 2024/0012098 A1* | 1/2024 | Albou .................... G01S 7/028 |
| 2024/0012137 A1* | 1/2024 | Albou .................. H01Q 1/3233 |

FOREIGN PATENT DOCUMENTS

| | | | |
|---|---|---|---|
| CN | 109690869 A | 4/2019 | |
| DE | 19710811 A1 * | 9/1998 | ........... G01S 13/931 |
| DE | 10 2011 115 829 A1 | 4/2013 | |
| DE | 10 2011 115 952 A1 | 4/2013 | |
| EP | 1 120 310 A2 | 8/2001 | |
| EP | 3 428 510 A1 | 1/2019 | |
| WO | WO 2013/012360 A1 | 1/2013 | |

OTHER PUBLICATIONS

Combined Chinese Office Action and Search Report issued Dec. 26, 2023, in corresponding Chinese Patent Application No. 202080055094.6 (with English Translation and English Translation of Category of Cited Documents) citing documents 1, 15-20 therein, 13 pages.

* cited by examiner

[Fig. 1]
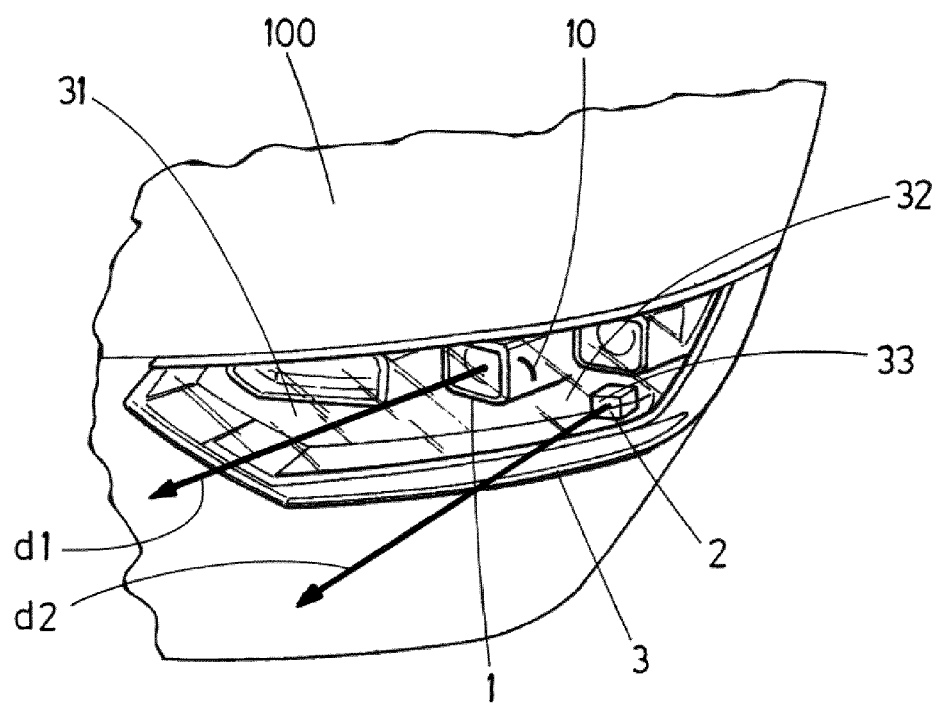

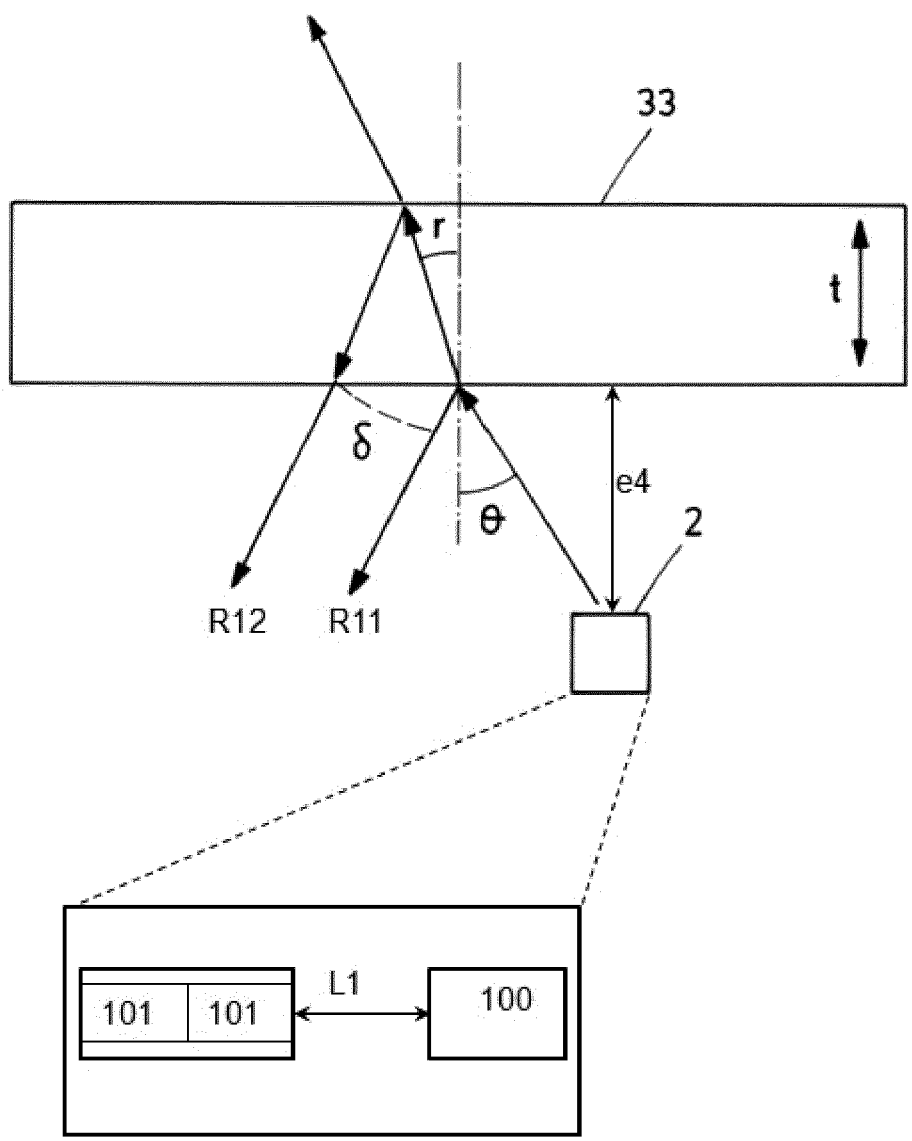
[Fig. 2]

AUTOMOTIVE LIGHTING DEVICE

This invention is related to the field of automotive lighting devices, and more particularly, to the synergy between these devices and autonomous driving functionalities.

Autonomous driving vehicles need a great amount of sensors, which are in charge of receiving redundant data of the surroundings of the vehicle with different kind of sensors, to avoid collisions and to make the vehicle arrive to the destination safe and sound. These sensors are placed in predetermined locations, so that the data covers the widest range of information possible.

The lighting devices of the vehicle (headlamp, rearlamp . . . ) are usually advantageous locations for some radar sensors, and the car manufacturers have to solve the problem of integrating a new element inside a device which is getting smaller.

Further, there are also problems with the behaviour of the outer lens, which is designed for the visible light, which is not optimized for radar emission and reception, causing, i.a., signal noise ratio.

Document US 2018/045826 A1 discloses a lighting device with an outer lens with different portions, wherein the portion of the lens which is located in front of the radar has a lower visible light transmittance.

The invention provides an alternative solution for managing a radar sensor inside the automotive lighting device by an automotive lighting device according to claim 1. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides an automotive lighting device comprising:
 a light source configured to emit light in a light direction;
 a sensor configured to acquire information outside the lighting device by emitting a wave in a sensor direction, the wavelength of the wave being comprised between 1 mm and 1 cm; and
 a cover comprising a first portion located in the light direction and a second portion located in the sensor direction, the second portion comprising a sensor region having a refractive index and a thickness which is comprised between 0.8 and 1.2 times an ideal thickness, the ideal thickness being equal to a natural number multiplied by the wavelength and divided by two times the refractive index.

The light direction and the sensor direction are particular directions where the wave amplitude is maximum: both the light source and the sensor emit in an angular region, but this angular region has a main direction, which is the light direction and the sensor direction, respectively.

Such a lighting device may house the sensor. As a consequence, the sensor may not need any further protection that may attenuate the emission and reception of the sensor. Further, the thickness of the cover is such that both in the emission and in the reception, the reflected waves will suffer a destructive interference, thus eliminating any attenuation in the sensor signal. This improves the performance of the sensor and allows new possibilities in the use of this element, either by increasing the range or by decreasing the power consumption.

In some particular embodiments, the light source is a solid-state light source.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the lifespan of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

These light sources are used in automotive vehicles, and match particularly advantageously with the sensor, since the solid-state light sources are smaller than traditional ones and have powerful means for heat dissipation.

In some particular embodiments, the sensor is a radar sensor and the wavelength is comprised between 3 and 5 mm.

This type of sensors are particularly suitable for autonomous driving applications, and the wavelength is advantageously suitable for detecting objects without an excessive power consumption or response delay.

In some particular embodiments, the thickness of the sensor region is comprised between 0.8 and 1.2 times the wavelength divided by two times the refractive index.

This thickness is the minimum one provided by the invention, and is the best option to avoid other interferences.

In some particular embodiments, the thickness of the second portion is equal or higher than the thickness of the sensor region.

The thickness along the second portion may be variable, since the directionality of the waves emitted by the sensor may require a greater thickness to achieve the same interference effect.

The thickness is defined with an incidence angle equal to $\arctan(L1/(2e4))$, with e4 the distance between the sensor and the cover and L1 the distance between an emitting antenna and receiving antennas of said sensor.

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 1 shows a section view of a lighting device according to the invention.

FIG. 2 shows a scheme of the wave path across the sensor region of the outer lens.

In these figures, the following reference numbers have been used:
 1 LED
 2 Radar sensor
 3 Outer lens
 31 first portion of the outer lens
 32 second portion of the outer lens 33 sensor region of the outer lens
d1 light direction
d2 sensor direction The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a section view of a lighting device 10 according to the invention. In this figure, the lighting device 10 comprises
 a LED 1;
 a radar sensor 2; and
 an outer lens 3.

The LED 1 is arranged to emit light in a light direction d1. This means that the distribution of the light has a maximum in the light direction d1, but obviously, the LED emits light in an angular range.

The radar sensor 2 is in turn arranged to acquire information outside the lighting device by emitting a radar wave in a sensor direction d2. The radar sensor 2 comprises at least one emitting antenna 100 and at least two receiving antennas 101 as illustrated in FIG. 2. The emitting antenna 100 is configured to emit the radar wave. The receiving antennas 101 are configured to receive the radar waves R11, R12 (illustrated in FIG. 2) retransmitted towards the radar sensor 2 after having encountered an object (such as a pedestrian in a non-limitative example). Said retransmitted radar was R11, R12 are also called reflected radar waves R11, R12. There is a phase shift between the retransmitted radar waves received by the receiving antennas 101 which makes it possible to deduce the position of the object relative to the vehicle, object which is in the external environment of the vehicle.

The wavelength of the radar wave is comprised between 1 mm and 1 cm, which corresponds to a frequency between 30 Ghz (for 1 cm) and 300 GHz (for 1 mm). Therefore the frequency is within the range of 1 GHz (300 mm) to 300 GHz (1 m), which is the micro-waves frequencies range.

This wave is emitted in a frequency around 76 GHz, so its wavelength is around 4 mm. The same as in the previous case, the intensity of the radar wave has a maximum in the sensor direction d2, but there is also emission of the radar wave in an angular range. Naturally, this frequency is a non-limitative example. In a non-limitative embodiment, the wave is emitted on a frequency band between 100 MHz and 3 GHz. Thus, in a non-limitative example, if the sensor radar 2 operates at a radar frequency of 77 GHz with a frequency band of 1 GHz, the radar sensor 2 will operate on a frequency band from 76.5 GHz to 77.5 GHz.

The outer lens 3 comprises a first portion 31 and a second portion 32. The first portion 31 is located in the light direction and the second portion 32 is located in the sensor direction, so that the first direction d1 crosses the first portion 31 and the second direction d2 crosses the second portion 32. In this non-limitative example, the cover 3 is an outer lens. In other non-limitative examples, the cover 3 is a bezel, or a radome.

The second portion 32 comprises in turn a sensor region 33 which has a refractive index and a thickness.

FIG. 2 shows a scheme of the wave path across the sensor region 33 of the outer lens. This sensor region 33, due to its thickness, may be treated as a thin layer.

The wave is emitted from the radar sensor 2 and travels until the sensor region 33, which has a refractive index n and a thickness t. Reflection and refraction phenomena take place as usual. The optical path difference δ of the reflected light is calculated in order to determine the condition for interference:

$$\delta = 2 \cdot n \cdot t \cdot \cos(r) + \lambda/2$$

The phase shift between the two reflected waves (the one R11 which has been reflected from the face of the sensor region 33 which in regard to the radar sensor 2, and the one R12 which has been reflected inside the sensor region 33 as illustrated in FIG. 2) is equal to $2\pi(n \times 2t \times \tan(r)\sin(\theta))/\Delta) + \pi$. Since $\sin(\theta) = n \sin(r)$, this leads to a phase shift equal to $(2\pi \times n \times (2t \times \cos(r)/\Delta) + t$. As δ equal to the phase shift multiplied by $\lambda/2*\pi$, one obtains $\delta = 2 \cdot nt \cdot \cos(r) + \lambda/2$.

In order to have destructive interference, the phase shift should be equal to π modulo 2π. Hence the phase shift equal to $(2m+1)*\pi$, with m a natural number. This leads to $(2m+1)*\pi = (2\pi \times n \times (2t \times \cos(r)/\lambda) + \pi$. This leads to $t = m \lambda/(2n \cos(r))$.

Thus, based on the refractive index n and of the wavelength A used over the operating frequency range of the radar sensor 2, the thickness t can be determined so that said reflected waves R11 and R12 cancel each other.

An ideal thickness is defined when the incidence angle θ is considered as 0, an m (described hereinafter) is equal to 1. Since the incidence angle θ is considered as 0, the angle r will be 0 as well. As a consequence, for a destructive interference condition, the following equation is to be solved:

$$2 \cdot n \cdot t + \lambda/2 = \lambda/2 + m\lambda$$

wherein m is a natural number. For m=1, the thickness of this sensor region 33 is $t = \lambda/(2n)$, wherein λ is the wavelength of the radar wave. This thickness t is the ideal thickness. When r=0°, which means cos (r)=1, and when the phase shift is equal to π modulo 27c, this leads to $(2m+1)*\pi = (2\pi \times n \times (2t/\lambda) + \pi$. And, when one multiplies each side of the equation by $\lambda/2\pi$, this leads to $2 \cdot nt + \lambda/2 = \lambda/2 + m\lambda$ and to ideal thickness $t = \lambda/(2n)$.

The sensor region 33 has a thickness which is between 0.8 and 1.2 times said ideal thickness. This equation is applied whatever the value of the angle r is. This range of value takes into account the possible angles of emission of the radar sensor 2. The possible values of the incidence angle θ are defined in the technical specifications of the radar sensor 2, which means the possible values of the incidence angle θ are in the field of view of the radar sensor 2. Usually, the incidence angle θ is between 0° and +−30°. This range value of 0.8 to 1.2 enables to take into account the manufacturing tolerances of the thickness of the sensor region 33.

In non-limitative examples, when the ideal thickness equal to 1.18 (for n=1.67, m=1 and λ=3.947), t is between 0.94 mm and 1.42 mm.

It is to be noted that there is a value of the angle of incidence 8 for which the reflected waves R11, R12 cause a maximum of disturbance for the receiving antennas of the radar sensor 2. In a non limitative embodiment, this value is equal to $8 = \arctan(L1/(2e4))$, with L1 the distance between the transmitting antenna 100 and the receiving antennas 101 of the radar sensor 2 and e4 the distance between the radar sensor 2 and the cover 3 as illustrated in FIG. 2. In a non-limitative embodiment, the value of the thickness t is defined for an incidence angle θ=arctan (L1/(2e4)). This makes it possible to be sure of suppressing the disturbances created by the reflected waves R11, R12 when they are at their maximum.

It is to be understood that the present invention is not limited to the aforementioned embodiments or applications, and variations and modifications may be made without departing from the scope of the invention. In the respect, the following remarks are made. In other non-limitative embodiments, the corresponding frequency of the wavelength of the wave may be within the so millimetre frequency range (24 GHz to 300 GHz) or the high frequency range (300 Mhz to 81 GHz). In another non-limitative embodiment, the lighting device 10 has been described for an automotive vehicle, but it may be used within any other types of vehicle, such as semi-automotive or non-automotive ones.

The invention claimed is:

1. Automotive lighting device comprising:
 a light source configured to emit light in a light direction;
 a sensor configured to acquire information outside the lighting device by emitting a wave in a sensor direction, the wavelength of the wave being comprised between 1 mm and 1 cm; and
 a cover comprising a first portion located in the light direction and a second portion located in the sensor direction, the second portion comprising a sensor region having a refractive index and a thickness which is comprised between 0.8 and 1.2 times an ideal thickness, the ideal thickness being equal to a natural number multiplied by the wavelength and divided by two times the refractive index, wherein the thickness is defined for an incidence angle (θ) equal to arctan (L1/(2e4)), with e4 the distance between the sensor and the cover and L1 the distance between an emitting antenna and receiving antennas of said sensor.

2. Automotive lighting device according to claim 1, wherein the light source is a solid-state light source.

3. Automotive lighting device according to claim 1, wherein the sensor is a radar sensor and the wavelength is comprised between 3 and 5 mm.

4. Automotive lighting device according to claim 1, wherein the thickness of the sensor region is comprised between 0.8 and 1.2 times the wavelength divided by two times the refractive index.

5. Automotive lighting device according to claim 1, wherein the thickness of the second portion is equal or higher than the thickness of the sensor region.

6. Automotive lighting device according to claim 1, wherein the thickness of the second portion is variable.

7. Automotive lighting device according to claim 1, wherein the incidence angle (θ) is between 0° and +−30°.

* * * * *